US005834920A

United States Patent [19]

Daniel

[11] Patent Number: 5,834,920

[45] Date of Patent: Nov. 10, 1998

[54] HOLDER FOR SECURING A RECHARGE PLUG IN A CELLULAR TELEPHONE STAND

[76] Inventor: Eran Daniel, House No. 52, Kochav Michael 79304, Israel

[21] Appl. No.: 743,651

[22] Filed: Nov. 5, 1996

[51] Int. Cl.[6] .......................... H01M 10/44; H01M 10/46

[52] U.S. Cl. .................................................................. 320/2

[58] Field of Search ............................ 320/2, 5; 439/374, 439/345, 153

[56] References Cited

U.S. PATENT DOCUMENTS

| | | | |
|---|---|---|---|
| 3,710,224 | 1/1973 | Daniels | 320/2 |
| 3,723,947 | 3/1973 | Lozeau | 339/91 R |
| 3,824,472 | 7/1974 | Engel et al. | 325/355 |
| 3,896,364 | 7/1975 | Reister | 320/2 |
| 4,092,580 | 5/1978 | Prinsze | 320/2 |
| 4,345,147 | 8/1982 | Aaron et al. | 235/385 |
| 4,558,270 | 12/1985 | Liautaud et al. | 320/2 |
| 4,573,234 | 3/1986 | Kochte et al. | 320/2 X |
| 4,684,192 | 8/1987 | Long et al. | 439/374 |
| 5,030,902 | 7/1991 | Mattinger et al. | 320/2 |
| 5,075,615 | 12/1991 | Dantis | 320/2 |
| 5,124,532 | 6/1992 | Hafey et al. | 320/2 X |
| 5,151,643 | 9/1992 | Emmert et al. | 320/2 |
| 5,159,256 | 10/1992 | Mattinger et al. | 320/2 |
| 5,208,525 | 5/1993 | Lopic et al. | 320/2 |
| 5,220,270 | 6/1993 | Peickert | 320/2 |
| 5,254,927 | 10/1993 | Chiang | 320/2 |
| 5,256,953 | 10/1993 | Cimbal et al. | 320/2 |
| 5,256,955 | 10/1993 | Tomura et al. | 320/2 |
| 5,336,984 | 8/1994 | Mischenko et al. | 320/2 |
| 5,354,215 | 10/1994 | Viracola | 320/2 X |
| 5,372,514 | 12/1994 | Odemer et al. | 320/2 X |
| 5,426,358 | 6/1995 | Leiserson et al. | 320/2 |
| 5,473,242 | 12/1995 | McKenna | 320/2 |

*Primary Examiner*—Edward Tso
*Attorney, Agent, or Firm*—Mark M. Friedman

[57] ABSTRACT

An independent, grooved member for securing a recharge plug inside a cavity of a phone recharge stand, such that the plug is engaged and disengaged with a recharge socket in the phone body when the phone is inserted or removed from the recharge stand.

17 Claims, 5 Drawing Sheets

10
24
8

HOLDER FOR SECURING A RECHARGE PLUG IN A CELLULAR TELEPHONE STAND

FIELD AND BACKGROUND OF THE INVENTION

The present invention relates to rechargeable electronic devices and, in particular, it concerns certain models of cellular phones featuring a recharge plug which fits loosely into a stand for storing the phone.

Cellular phones are very common today in all industrialized nations. Virtually all models of cellular phones, hereinafter referred to as 'phones,' feature rechargeable batteries. The most common recharge mediums are plugs connected to a vehicle battery and plugs connected to a wall outlet. The present invention relates to the ease with which such plugs are inserted into a respective socket in the phone or phone battery, hereinafter referred to as the 'socket.'

Basically, two styles of insertion exist. The first, is that the end of the wire to be inserted into the phone, hereinafter referred to as the 'plug,' is loose. With such wires, the operator of the phone must maneuver the plug in order to insert it directly into the socket. This is not a convenient method of inserting the plug, and requires a relatively large amount of effort, particularly when the operator is driving a vehicle at the same time.

The second model of insertion features a stand onto which the phone is placed. On an upper surface of the stand, there is a connector which is configured, due to the shape of the stand, to enter the socket whenever the phone is placed onto the stand. Typically such phones are fashioned to complement a respective stand. Examples of devices with such respective recharge stands may be found in U.S. Pat. Nos. 5,030,902; 5,159,256; 4,684,192; 5,256,953; 4,558,270; and 5,336,984.

The present invention relates to particular models of cellular phones that feature the first model of plug insertion. These models also feature a stand typically used in a vehicle for maintaining the phone in a convenient position for the driver, but these stands do not accommodate the plug in a manner facilitating the second style of plug insertion mentioned above. It is the object of the present invention to provide a device for use with respective stands fashioned for these models of phones, affording operators of these phones the second style of plug insertion, i.e., that the plug is automatically inserted into its respective socket when the phone is placed on the stand, and also that the plug is automatically disengaged from the socket when the phone is removed from the stand.

There is therefore a need to provide the advantages of the second style of plug insertion at a minimum cost to operators of phones designed to function according to the first mode of plug insertion.

SUMMARY OF THE INVENTION

The present invention is of a plug holder for securing a recharge plug in a cellular phone stand. The stand features a cavity for loosely accommodating a recharge plug.

According to the teachings of the present invention there is provided, a plug holder realized as an independent grooved member. The plug holder features inner and outer surfaces. The outer surface is the surface of the plug holder which faces the cavity walls when the plug holder is inserted into the cavity. Accordingly, it is dimensioned substantially according to the dimensions of the cavity in the cellular phone stand. The inner surface is the surface of the groove of the plug holder. It is dimensioned substantially according to the dimensions of a recharge plug. Thus, an appropriate recharge plug inserted into the groove of the plug holder is secured by the inner surface of the plug holder. Essentially, by inserting the plug holder into the cavity of the cellular phone stand, the plug holder adapts the cavity of the cellular phone stand to the recharge plug.

According to further features in preferred embodiments of the invention described below, the plug holder is made of a rigid material, such as, but in no way limited to, rigid plastic.

According to further features in preferred embodiments of the invention described below, the plug holder is made of a flex-rigid material.

According to still further features in preferred embodiments of the invention described below, the inner and outer surfaces of the plug holder conform to the dimensions described above when the plug holder is inserted into the cavity, by virtue of the flex-rigid material of which the plug holder is made.

According to still further features in preferred embodiments of the invention, the inner surface of the plug holder is shaped to accommodate recharge plugs typically used with phones manufactured by various manufacturers.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a plug holder for maintaining a recharge plug in position in a cellular phone stand.

The principles and operation of the plug holder according to the present invention may be better understood with reference to the drawings and the accompanying description.

Figure 1:
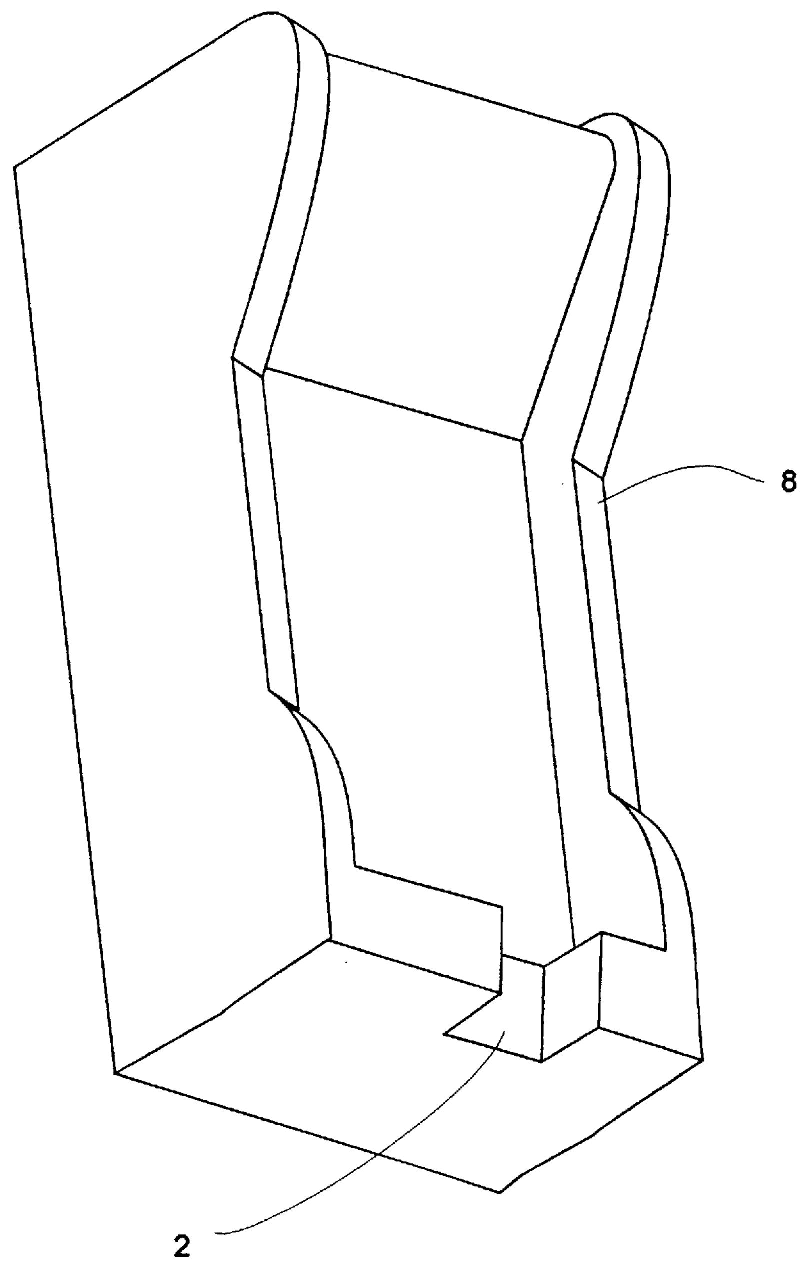
FIG. 1 illustrates a typical cellular phone stand.
Figure 2:
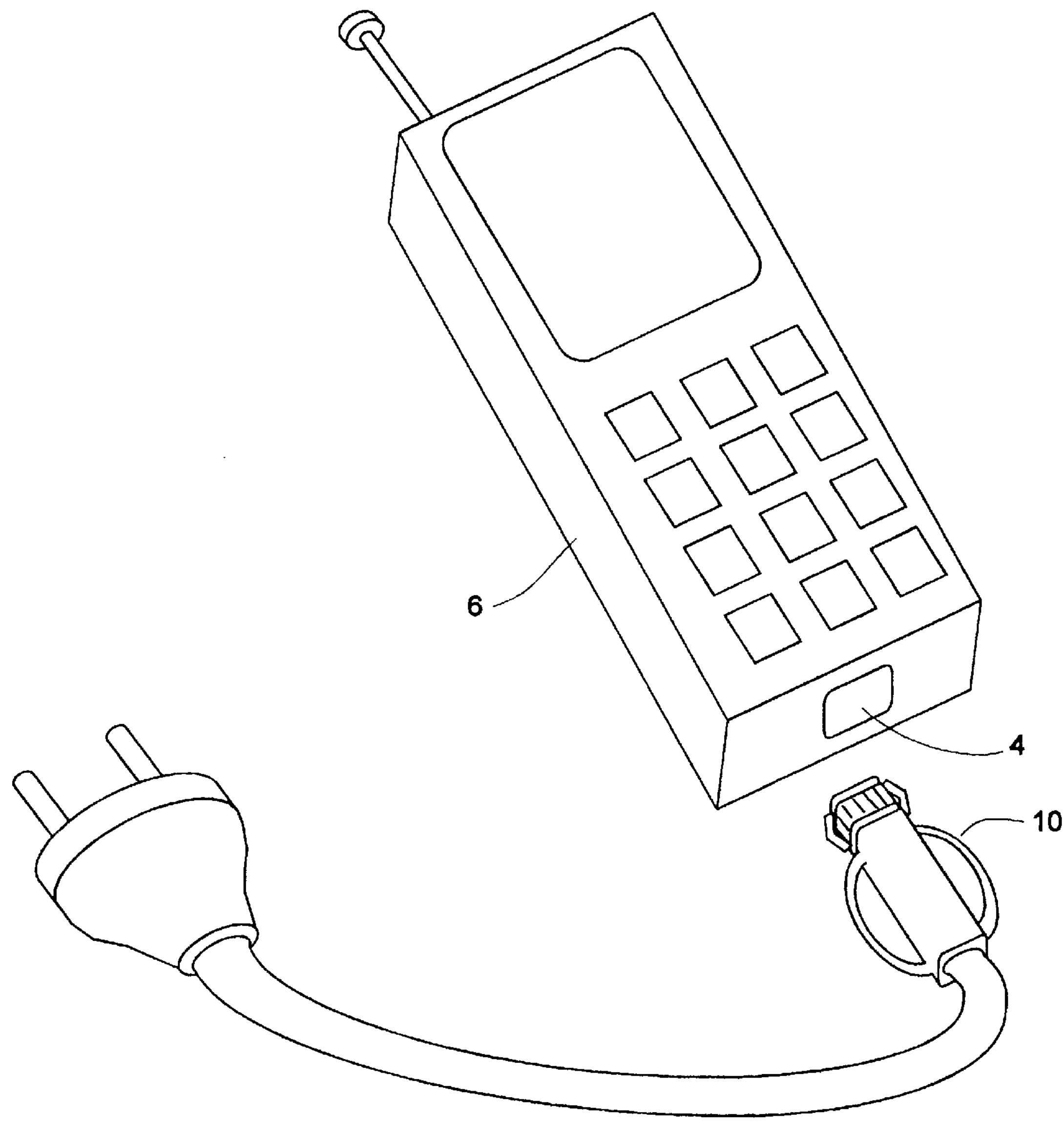
FIG. 2 illustrates a cellular phone with a recharge plug.
Figure 3:
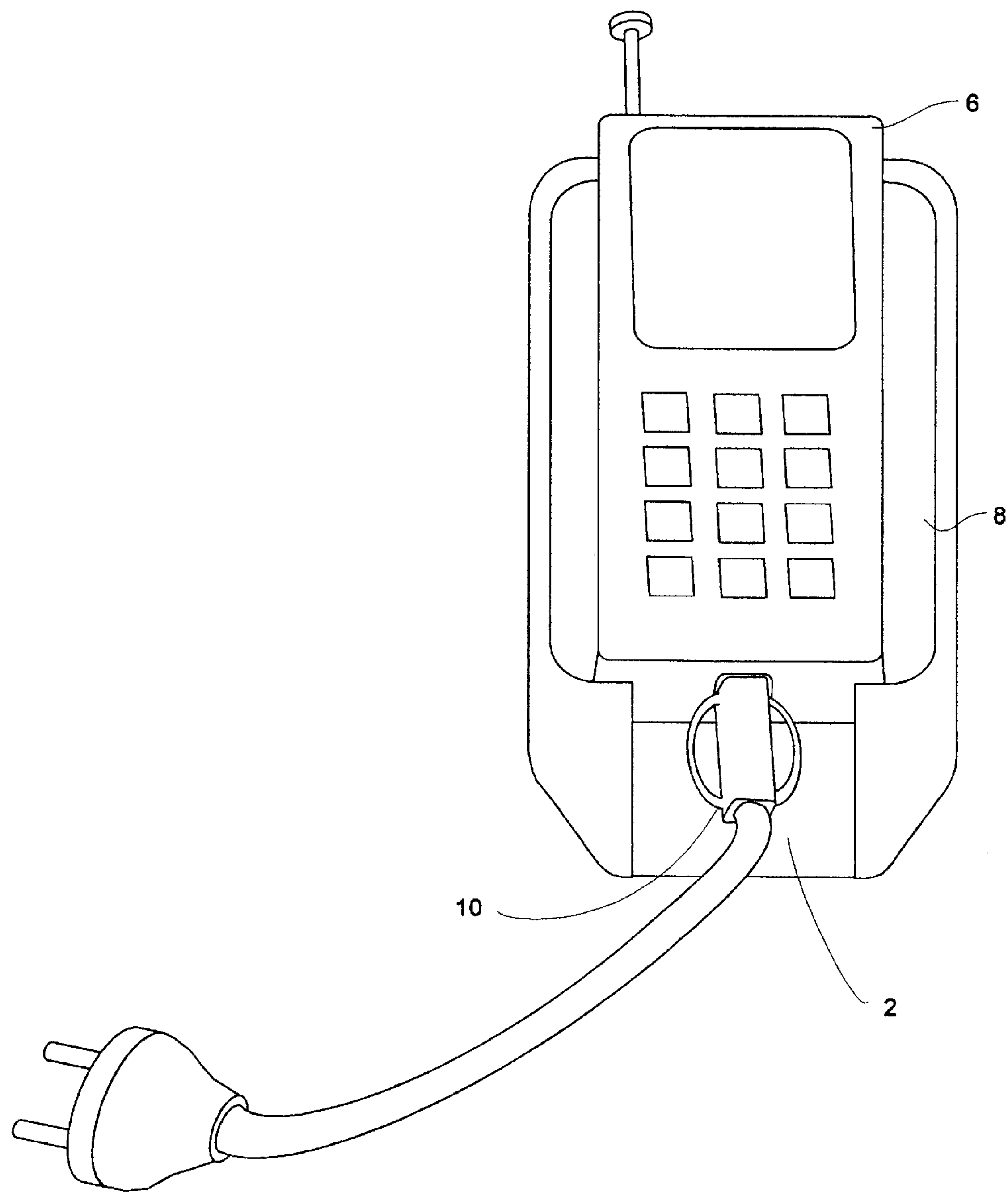
FIG. 3 illustrates a cellular phone being recharged in a phone stand, according to the prior art.

Referring now to the drawings, the phone holders or stands designed for, and used in conjunction with many of the phones targeted by the present invention feature cavity 2 (shown in FIGS. 1 and 3) for recharge wire and plug 10. Cavity 2 is opposite socket 4 (shown in FIG. 2) when phone 6 is placed in phone stand 8. The present invention discloses a plug holder realized as a grooved member to be inserted into that cavity in order to maintain plug 10 inside the cavity. With the plug holder in place (it fits tightly into the cavity), portion 26 of plug 10 (shown in FIG. 4) fits tightly inside the narrow groove of the plug holder and maintains portion 28 of plug 10 extended beyond cavity 2 such that when phone 6 is placed into phone stand 8, portion 28 is inserted into socket 4. Also, when phone 6 is removed from phone stand 8, plug 10 is retained in the narrow groove, thus disengaging plug 10 from socket 4.

Figure 4:
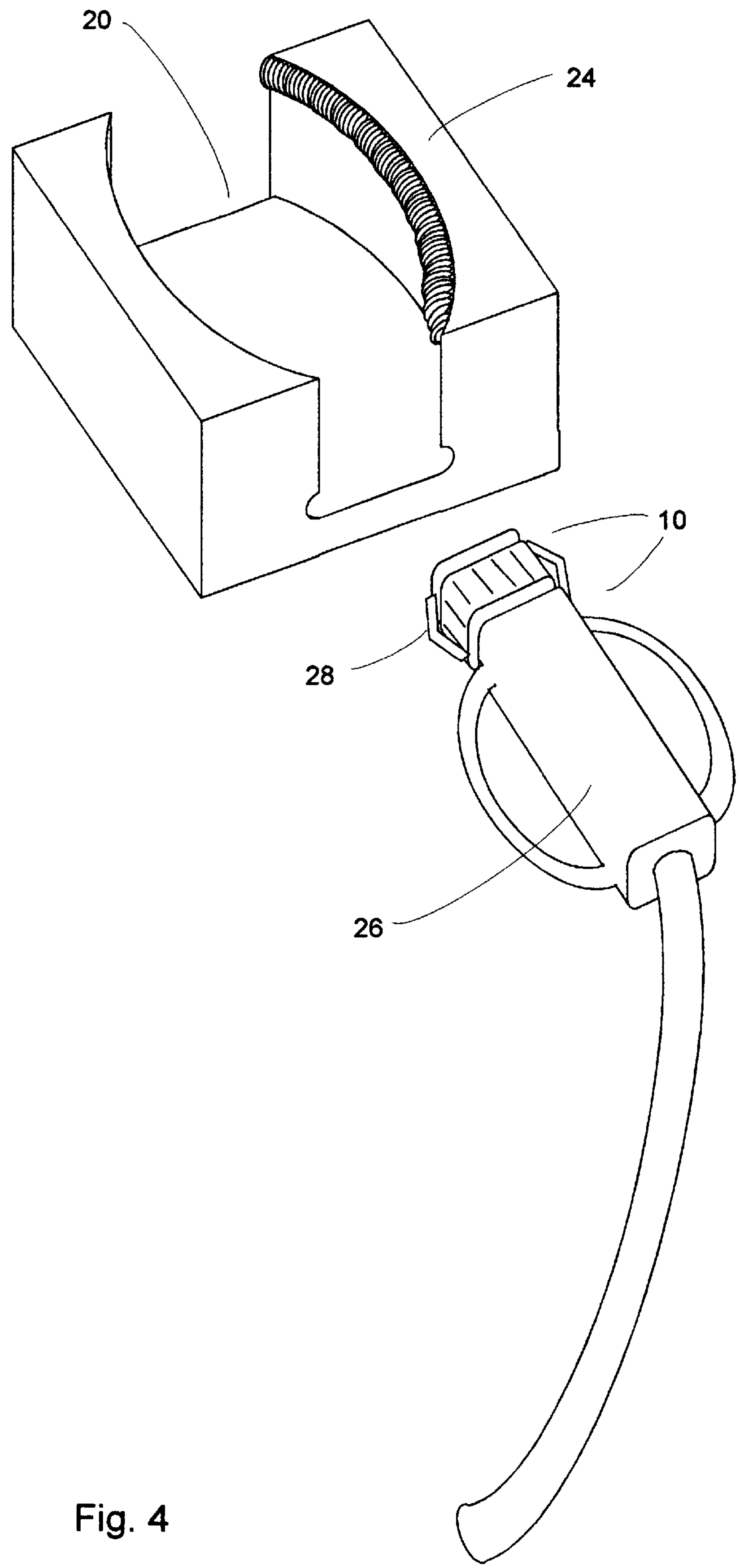
FIG. 4 illustrates an embodiment of the invention for a particular recharge plug.

FIG. 4 illustrates a plug holder as taught by the present invention. Thus FIG. 4 features plug holder 24, realized as a grooved member. Plug holder 24 is shown inside cavity 2 in FIG. 5. The dimensions of groove 20 of plug holder 24 are formed to the dimensions of portion 26 of plug 10, as shown in FIG. 4, thus securing plug 10 inside the plug holder.

According to a preferred embodiment of the invention, the plug holder is made of a flex-rigid material facilitating securing the plug holder inside cavity 2 by virtue of outward pressure exerted on the cavity walls by the walls of the plug holder. According to this embodiment, the walls of plug holder 24 form obtuse angles with the portion of plug holder 24 joining the two walls when plug holder 24 is outside cavity 2 (this stage not shown) and only when inserted into cavity 2 does each wall stand upright and form a substantially right angle with the joining portion.

Figure 5:
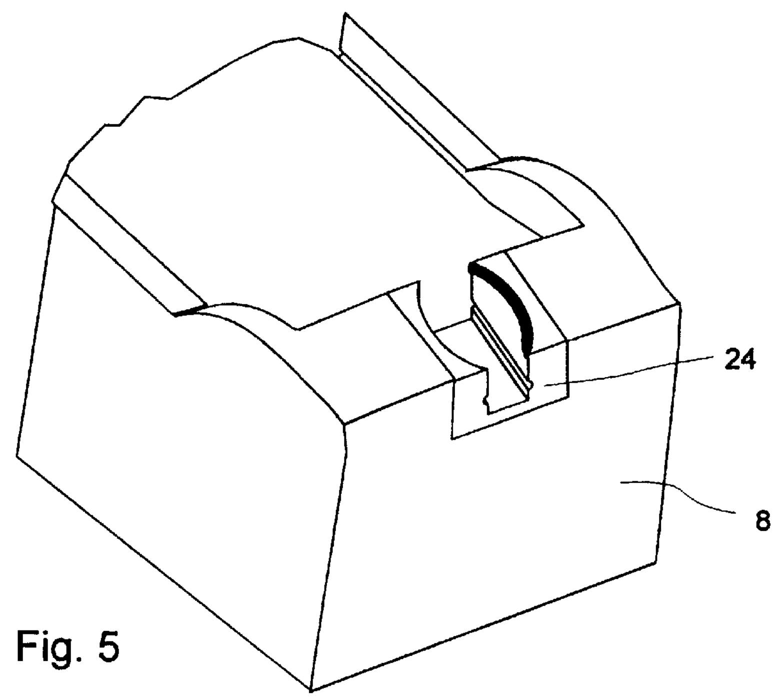
FIG. 5 illustrates the plug holder of FIG. 4 inserted into a respective cellular phone stand.
Figure 6:
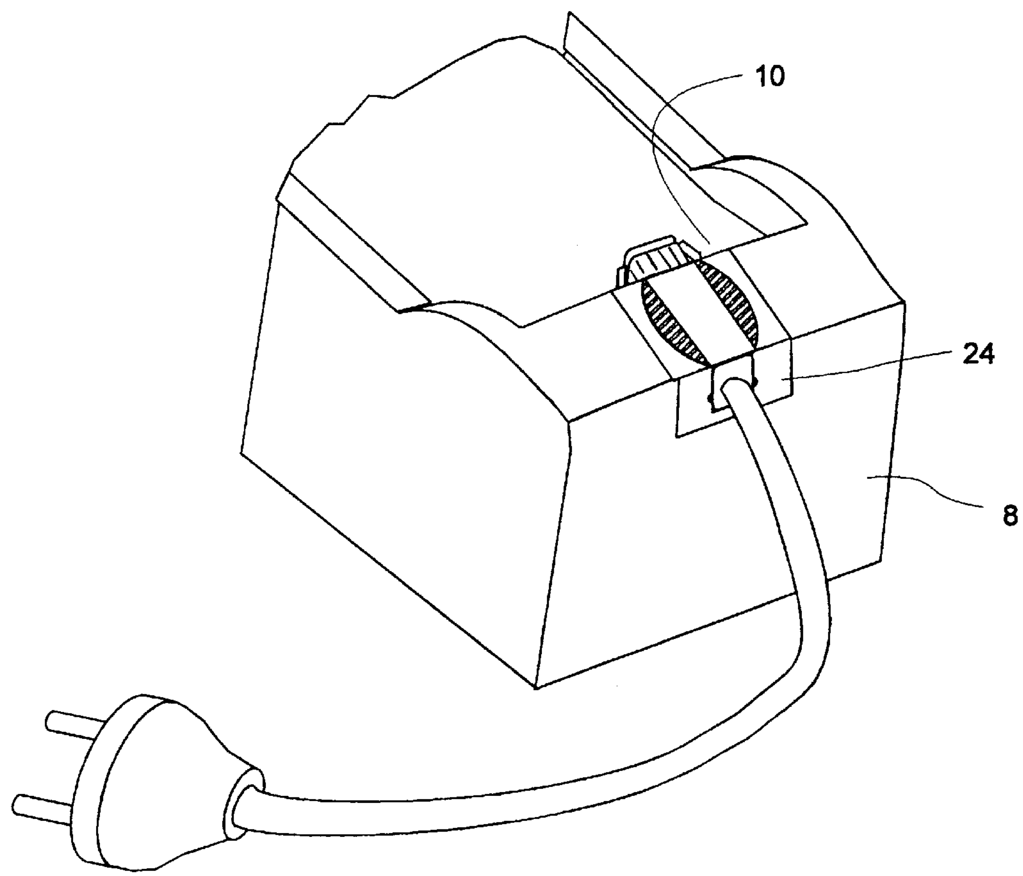
FIG. 6 illustrates a plug secured in a phone stand according to the teachings of the present invention.

Thus, an embodiment of the invention is shown in FIGS. 4–6. Here a plug holder is shown designed for a particular model of cellular phone recharge plug. Similar plugs are used with cellular phones manufactured by the various manufacturers. Thus, as can be seen from FIG. 4, groove 20 is formed to accommodate portion 26 of plug 10. FIG. 6 shows plug holder 24 inserted into a respective cavity in phone stand 8.

It will be appreciated that the above descriptions are intended only to serve as examples, and that many other embodiments are possible within the spirit and the scope of the present invention.

What is claimed is:

1. A holder for securing a recharge plug in a cellular phone stand, the stand featuring a cavity for accommodating a recharge plug, the holder comprising an independent, grooved member featuring an inner surface and an outer surface, said outer surface formed according to dimensions of the cavity, said inner surface formed according to dimensions of the recharge plug.

2. The holder of claim 1, wherein the holder is made of a flex-rigid material.

3. The holder of claim 1, wherein said inner and outer surface forms are realized when said holder is inserted into the cavity.

4. The holder of claim 1, wherein the holder is made of a rigid material.

5. The holder of claim 1, wherein said inner surface is shaped to accommodate a recharge plug typically used with cellular phones.

6. The holder of claim 1, wherein said inner surface is formed so that the plug fits tightly in the holder.

7. The holder of claim 1, wherein said outer surface is formed so that the holder fits tightly in the stand.

8. A holder for holding a recharge plug in a cellular phone stand, the cellular phone stand featuring a cavity formed for accommodating a recharge plug, the holder comprising a grooved member featuring an inner surface and an outer surface; said outer surface accommodated by the cavity formed in the stand; and said inner surface accommodating the recharge plug.

9. The holder of claim 8, wherein said holder is made of a flex-rigid material.

10. The holder of claim 9, wherein said inner and outer surface forms are realized when said holder is inserted into said cavity formed in said stand.

11. The holder of claim 8, wherein said holder is made of a rigid material.

12. The holder of claim 8, wherein said inner surface is shaped to accommodate a recharge plug typically used with cellular phones.

13. The holder of claim 8, wherein the plug fits tightly in the holder.

14. A method for securing a recharge plug in a cellular phone stand that features a cavity formed in the stand for accommodating a recharge plug, comprising the steps of:

(a) providing a first holder for holding the recharge plug, said first holder including a grooved member featuring an inner surface and an outer surface, said outer surface accommodated by the cavity formed in the stand, and said inner surface accommodating the recharge plug;

b) situating said first holder in the stand; and (c) placing the cellular phone recharge plug in said first holder.

15. The method of claim 14, further comprising the step of:

(d) placing a cellular phone in the stand, said cellular phone featuring a socket formed in the cellular phone for accommodating said recharge plug, such that placing said cellular phone in said stand results in the automatic insertion of the recharge plug into the cellular phone socket.

16. The method of claim 15, further comprising the step of:

(e) removing the cellular phone, such that the recharge plug is automatically disengaged from the socket when the phone is removed from the stand.

17. The method of claim 14, further comprising the step of:

(d) Replacing said first holder with a second holder having an inner surface permitting attachment of a plug having a different configuration.

* * * * *